(12) United States Patent
Akanuma et al.

(10) Patent No.: US 9,024,489 B2
(45) Date of Patent: May 5, 2015

(54) VIBRATION GENERATOR

(71) Applicant: Nidec Seimitsu Corporation, Ueda-shi, Nagano (JP)

(72) Inventors: Tomohiro Akanuma, Ueda (JP); Yuuki Yamada, Ueda (JP); Tetsuya Inoue, Ueda (JP)

(73) Assignee: Nidec Seimitsu Corporation, Ueda-shi (JP)

( * ) Notice: Subject to any disclaimer, the term of this patent is extended or adjusted under 35 U.S.C. 154(b) by 303 days.

(21) Appl. No.: 13/750,534

(22) Filed: Jan. 25, 2013

(65) Prior Publication Data

US 2013/0221767 A1    Aug. 29, 2013

(30) Foreign Application Priority Data

Feb. 23, 2012    (JP) .................................. 2012-037328

(51) Int. Cl.
H02K 33/00    (2006.01)
H02K 33/02    (2006.01)
H02K 33/16    (2006.01)

(52) U.S. Cl.
CPC ............... *H02K 33/02* (2013.01); *H02K 33/16* (2013.01)

(58) Field of Classification Search
USPC .................... 310/15, 17, 21, 25, 29, 12.21, 81
See application file for complete search history.

(56) References Cited

U.S. PATENT DOCUMENTS

| | | | |
|---|---|---|---|
| 3,609,419 A * | 9/1971 | Greuter et al. | 310/25 |
| 2009/0096299 A1* | 4/2009 | Ota et al. | 310/25 |
| 2010/0213773 A1 | 8/2010 | Dong et al. | |
| 2011/0089772 A1 | 4/2011 | Dong et al. | |
| 2011/0127858 A1* | 6/2011 | Park | 310/25 |
| 2011/0169347 A1 | 7/2011 | Miyamoto et al. | |
| 2011/0241451 A1* | 10/2011 | Park | 310/25 |
| 2012/0032535 A1* | 2/2012 | Park | 310/25 |
| 2012/0187780 A1* | 7/2012 | Bang et al. | 310/25 |
| 2013/0229070 A1* | 9/2013 | Akanuma et al. | 310/25 |

FOREIGN PATENT DOCUMENTS

| | | |
|---|---|---|
| CN | 201388144 Y | 1/2010 |
| CN | 201708677 U | 1/2011 |
| CN | 102143808 A | 8/2011 |
| JP | 2002-200460 A | 7/2002 |
| WO | 2010/026883 A1 | 3/2010 |

* cited by examiner

*Primary Examiner* — Thanh Lam
(74) *Attorney, Agent, or Firm* — Westerman, Hattori, Daniels & Adrian, LLP (57) ABSTRACT

A vibration generator includes a housing, a vibrating body, and a leaf spring. The leaf spring includes a connection portion connected to the vibrating body at one longitudinal end of the leaf spring, an attachment portion attached to a circumferential wall portion at the other longitudinal end of the leaf spring and an intermediate portion formed between the connection portion and the attachment portion to extend around the vibrating body. The connection portion and the attachment portion are arranged along a direction intersecting a vibration direction of the vibrating body at the opposite sides of the vibrating body. The intermediate portion is arranged in an outside region around the vibrating body to extend across the vibration direction of the vibrating body.

7 Claims, 6 Drawing Sheets

VIBRATION GENERATOR

BACKGROUND OF THE INVENTION

1. Field of the Invention

The present invention relates to a vibration generator for use in a portable terminal or the like. More specifically, the present invention pertains to a vibration generator in which a vibrating body reciprocatingly vibrated by magnetic fields is supported by a leaf spring.

2. Description of the Related Art

A portable terminal such as a cellular phone or the like includes a vibration generator capable of notifying a user of arrival of an incoming call. Different types of vibration generators have heretofore been developed. For example, there is known a vibration generator in which an eccentric weight is attached to a rotating shaft. The vibration generator of this type generates vibrations by rotating the eccentric weight with a motor. In the vibration generator of this type, it is however difficult to reduce the thickness thereof. Moreover, the vibration generator of this type suffers from problems in that the vibration generator is low in durability and tends to generate noises during a long-time use.

As a solution to these problems, there is available a vibration generator that reciprocatingly vibrates a vibrating body using the magnetic fields formed by a coil and a magnet.

Japanese Patent Application Publication No. 2002-200460 discloses a technology on a vibration actuator. The vibration actuator includes a fixing portion serving as a cover; a vibrating body having a plurality of magnets and a yoke for closing the magnetic fluxes generated by the magnets; a plurality of elastic members for movably holding the vibrating body in the fixing portion; and a coil for generating a thrust force between the fixing portion and the vibrating body to make the vibrating body vibrate in a specified vibration direction by flowing an electric current in a direction to interlink with the magnetic flux generated by the magnets.

In the technology disclosed in Japanese Patent Application Publication No. 2002-200460, the vibrating body is held by the elastic members arranged at the opposite sides of the vibrating body in the vibration direction of the vibrating body. Each of the elastic members is formed by joining one longitudinal ends of two band-like leaf springs and bending the leaf springs from the joint portion at an acute angle. Alternatively, each of the elastic members may be formed by bending the longitudinal intermediate portion of a single band-like leaf spring.

PCT Patent Application Publication No. 2010/026883 discloses a technology on a linear motor and a cellular phone employing the linear motor. The linear motor includes a spiral coil and a vibrating body arranged in an opposing relationship with the spiral coil. The spiral coil includes a first portion extending in a direction orthogonal to the moving direction of the vibrating body and a second portion extending parallel to the moving direction of the vibrating body. The magnitude of the magnetic fluxes formed by the first portion is larger than the magnitude of the magnetic fluxes formed by the second portion.

In the technology disclosed in PCT Patent Application Publication No. 2010/026883, the vibrating body is held by leaf springs bent at an acute angle and arranged at the opposite sides of the vibrating body in the vibration direction of the vibrating body.

U.S. Patent Application Publication Nos. 2010/0213773 and 2011/0089772 discloses a technology on a linear vibrator. The linear vibrator includes a housing, a vibrating body supported by an elastic member, and a coil arranged within the housing.

The elastic member disclosed in U.S. Patent Application Publication No. 2010/0213773 includes an attachment portion attached to a circumferential wall portion and an arm portion provided with a holding portion. The attachment portion and the holding portion are arranged parallel to each other and are connected to each other by a U-like connecting portion. In the elastic member disclosed in U.S. Patent Application Publication No. 2011/0089772, a holding portion is detachably attached to an arm portion.

In the leaf spring structures disclosed in Japanese Patent Application Publication No. 2002-200460 and PCT Patent Application Publication No. 2010/026883, however, large stresses are generated in the portions of the leaf springs bent at an acute angle. For that reason, if the leaf springs work for a long period of time, the leaf springs may possibly be destroyed due to fatigue.

The elastic members disclosed in U.S. Patent Application Publication Nos. 2010/0213773 and 2011/0089772 are structurally complex and costly to manufacture.

SUMMARY OF THE INVENTION

In view of the problems noted above, the present invention provides a vibration generator capable of reducing stresses generated in a leaf spring for supporting a vibrating body and capable of enjoying a prolonged lifespan.

Further, the present invention provides a vibration generator which is structurally simple and which can be manufactured in a cost-effective manner.

In order to achieve the objects noted above, the present invention provides a vibration generator including a housing including a circumferential wall portion extending along a peripheral edge of the housing. The vibration generator includes a vibrating body arranged inside of the circumferential wall portion of the housing in an opposing relationship with a coil and configured to reciprocatingly vibrate in one direction. The vibration generator includes a band-like leaf spring arranged between the vibrating body and the circumferential wall portion to support the vibrating body on the circumferential wall portion. The leaf spring includes a connection portion connected to the vibrating body at one longitudinal end of the leaf spring, an attachment portion attached to the circumferential wall portion at the other longitudinal end of the leaf spring and an intermediate portion extended between the connection portion and the attachment portion around the vibrating body. The connection portion and the attachment portion are arranged along a direction intersecting a vibration direction of the vibrating body at the opposite sides of the vibrating body. The intermediate portion is arranged to extend across the vibration direction of the vibrating body in an outside region around the vibrating body.

In the present invention, the connection portion and the attachment portion are arranged along a direction intersecting a vibration direction of the vibrating body. The vibrating body is interposed between one transverse side and the other transverse side thereof. The connection portion is connected to the vibrating body at said one transverse side of the vibrating body. The attachment portion is attached to the circumferential wall portion at said the other transverse side of the vibrating body. The intermediate portion is arranged in a longitudinal outside region of the vibrating body to extend across the vibration direction of the vibrating body. It is therefore possible to prolong the total length of the leaf spring even within a limited space. For that reason, the stresses generated in the leaf spring can be dispersed over the total length of the leaf spring, thereby preventing large stresses from concentrating on one point of the leaf spring. As a result, it is possible to lengthen the lifespan of the vibration generator.

The intermediate portion may include a plurality of curved sections at which the leaf spring extends in a curved shape.

In the present invention, the leaf spring includes a plurality of curved sections. It is therefore possible to disperse the stresses generated in the leaf spring, thereby preventing large stresses from concentrating on one point of the leaf spring. The leaf spring is gently deformed in the curved sections. Therefore, as compared with a case where the leaf spring is bent at an acute angle, it is possible to reduce the stresses generated in the leaf spring.

The leaf spring may be curved in one transverse side region having the connection portion to protrude from the vibrating body toward the circumferential wall portion in a region on the side of the connection portion. The leaf spring may be obliquely formed in the longitudinal outside region of the vibrating body to go away from the vibrating body and come close to the circumferential wall portion as the leaf spring extends from the side of the connection portion to the side of the attachment portion. Further, the leaf spring may be curved from the outside region around the vibrating body toward a central region of the vibrating body on the side of the attachment portion.

In the present invention, the leaf spring is curved to protrude from the vibrating body toward the circumferential wall portion. The leaf spring is obliquely formed in the longitudinal outside region of the vibrating body to go away from the vibrating body and come close to the circumferential wall portion as the leaf spring extends from said one transverse side region to the other transverse side region having the attachment portion. Therefore, as compared with a case where the leaf spring is formed into a linear shape, it is possible to effectively prolong the total length of the leaf spring within a limited space defined between the vibrating body and the circumferential wall portion. This makes it possible to disperse the stresses generated in the leaf spring. Since the leaf spring is curved from the longitudinal outside region of the vibrating body toward a central region of the vibrating body in said the other transverse side region, it is possible to prevent generation of stresses in a partial area of the leaf spring.

The leaf springs may include first and second leaf springs respectively arranged at the opposite sides of the vibrating body in the vibration direction of the vibrating body.

In the present invention, the vibrating body is supported by the first and second leaf springs. It is therefore possible to reduce the load applied to the first and second leaf springs. In the present invention, it is also possible to vibrate the vibrating body in a well-balanced manner at the opposite sides in the vibration direction of the vibrating body.

The first and second leaf springs may be formed into an one-piece member.

In the present invention, the first and second leaf springs are formed into an one-piece member. It is therefore possible to reduce the number of components. This makes it possible to reduce the number of assembling steps and to facilitate an assembling process. In the present invention, the fixing strength and the accuracy of the leaf springs can be increased by forming the leaf springs into an one-piece member.

The housing may include a bottom member to which the coil is attached and a top portion arranged to close a top end of the housing. The vibrating body may include an upper surface making contact with an inner surface of the top portion. The vibration generator may include a sliding member arranged on at least one of the upper surface of the vibrating body and the inner surface of the top portion to smoothly slide the vibrating body with respect to the inner surface of the top portion.

In the present invention, the vibrating body is caused to vibrate along the top portion of the housing. It is therefore possible to prevent the vibrating body from being tilted and to effectively prevent the vibrating body from colliding with the housing and generating noises. Since the sliding member generating low friction between the vibrating body and the top portion is arranged on the upper surface of the vibrating body, there is no possibility that the smooth vibration of the vibrating body in hindered.

The coil may be a hollow-core spiral coil formed by spirally winding a wire. The bottom member of the housing may have a communication groove interconnecting the inside and the outside of the coil, the coil including a lead wire extending from an inner edge of the coil and passing through the communication groove.

In the present invention, the lead wire extending from the inner edge of the coil is not gripped between the coil and the bottom member. Accordingly, it is possible to prevent the coil from being tilted by inserting the lead wire. As a consequence, the coil can generate magnetic fields in a proper direction, which makes it possible to smoothly vibrate the vibrating body. Since the coil is not tilted, it is possible to prevent the coil from making contact with the vibrating body and generating noises.

The vibration generator according to the present invention is capable of reducing stresses generated in the leaf spring for supporting the vibrating body and capable of enjoying a prolonged lifespan. In addition, the vibration generator according to the present invention is structurally simple and can be manufactured in a cost-effective manner.

Other features, elements, steps, characteristics and advantages of the present invention will become more apparent from the following detailed description of preferred embodiments of the present invention with reference to the attached drawings.

DETAILED DESCRIPTION OF THE INVENTION

Preferred embodiments of the present invention will now be described with reference to the accompanying drawings which form a part hereof. The technical scope of the present invention is not limited to the following description and the accompanying drawings.

A vibration generator 1A or 1B according to the present embodiment is arranged within a portable terminal such as a cellular phone or the like. The vibration generator 1A is a basic-type vibration generator according to a first preferred embodiment shown in FIGS. 1 through 5. The vibration generator 1B is a vibration generator according to a second preferred embodiment shown in FIG. 6, in which a vibrating body is brought into contact with a case without providing a space between the upper surface of the vibrating body and the top portion of the case. The present invention will now be described on an embodiment-by-embodiment basis.

First Preferred Embodiment

The basic structure of the vibration generator 1A according to the first preferred embodiment of the present invention is as follows.

Figure 1:
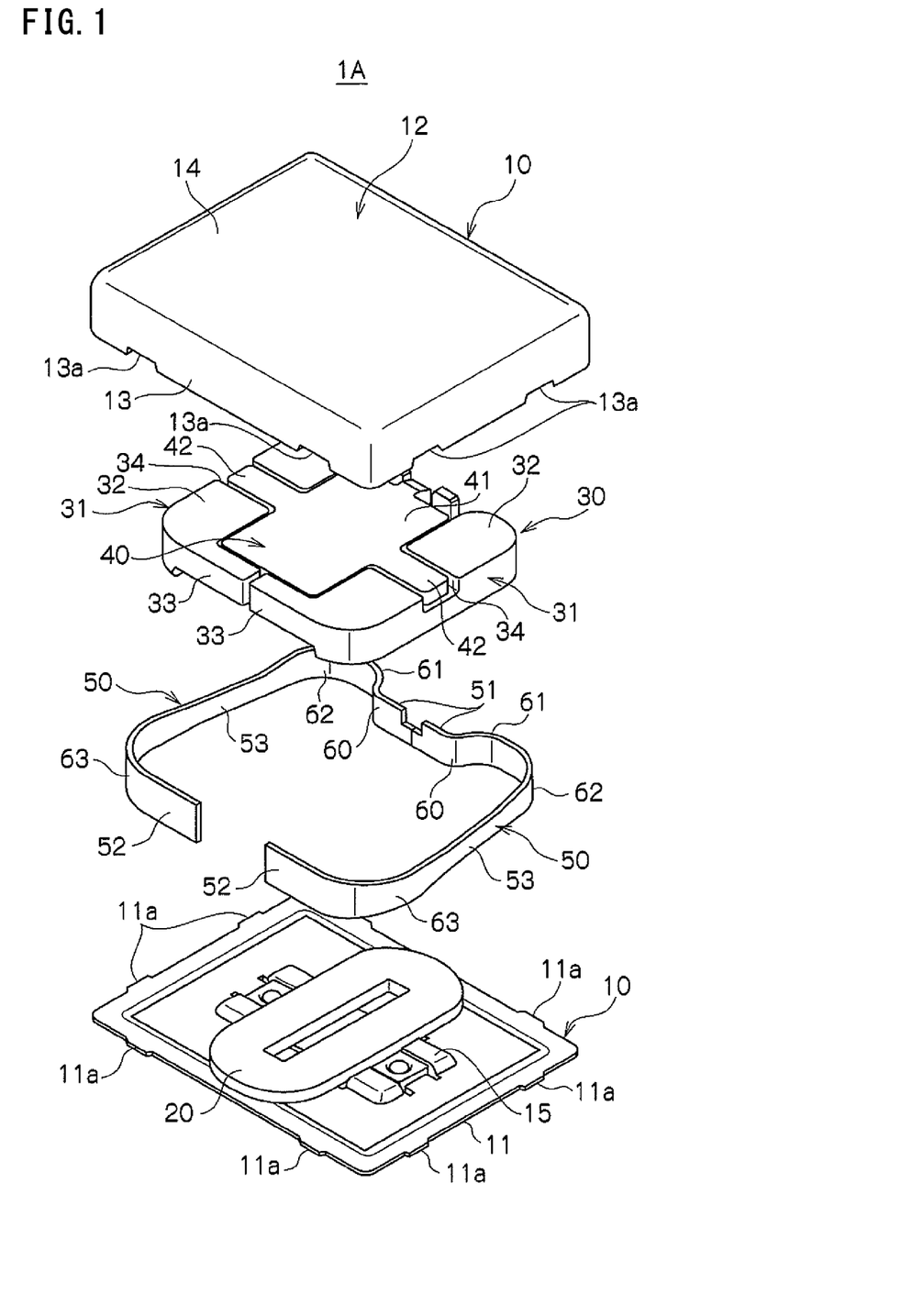
FIG. 1 is an exploded perspective view showing a vibration generator according to a first preferred embodiment of the present invention.
Figure 2:
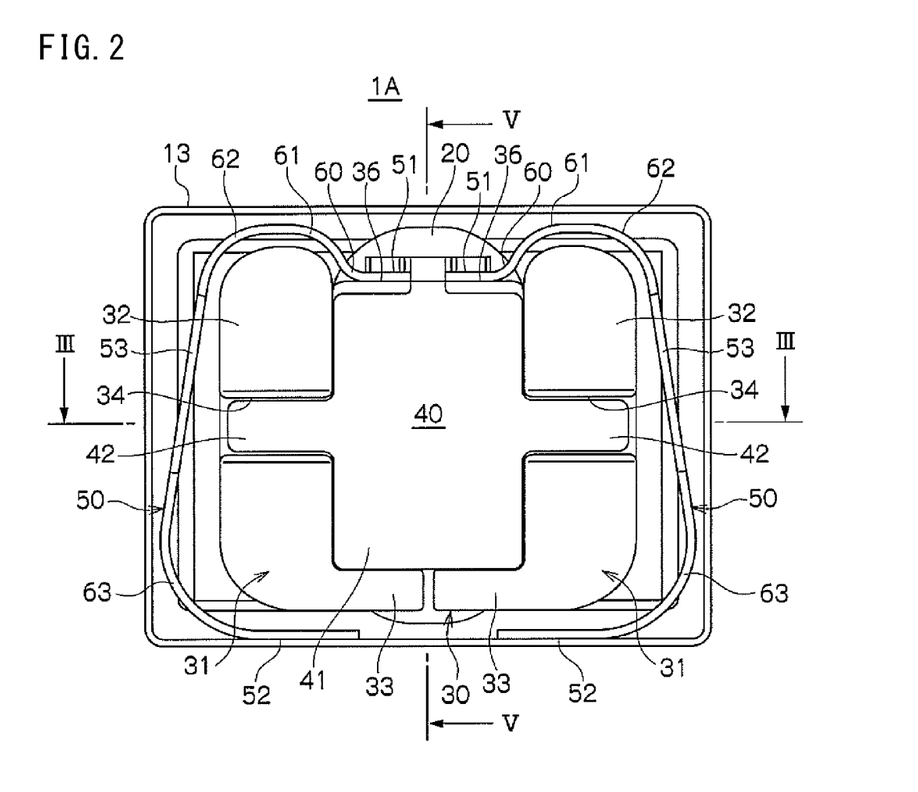
FIG. 2 is a plan view showing an internal structure of the vibration generator shown in FIG. 1.
Figure 3:
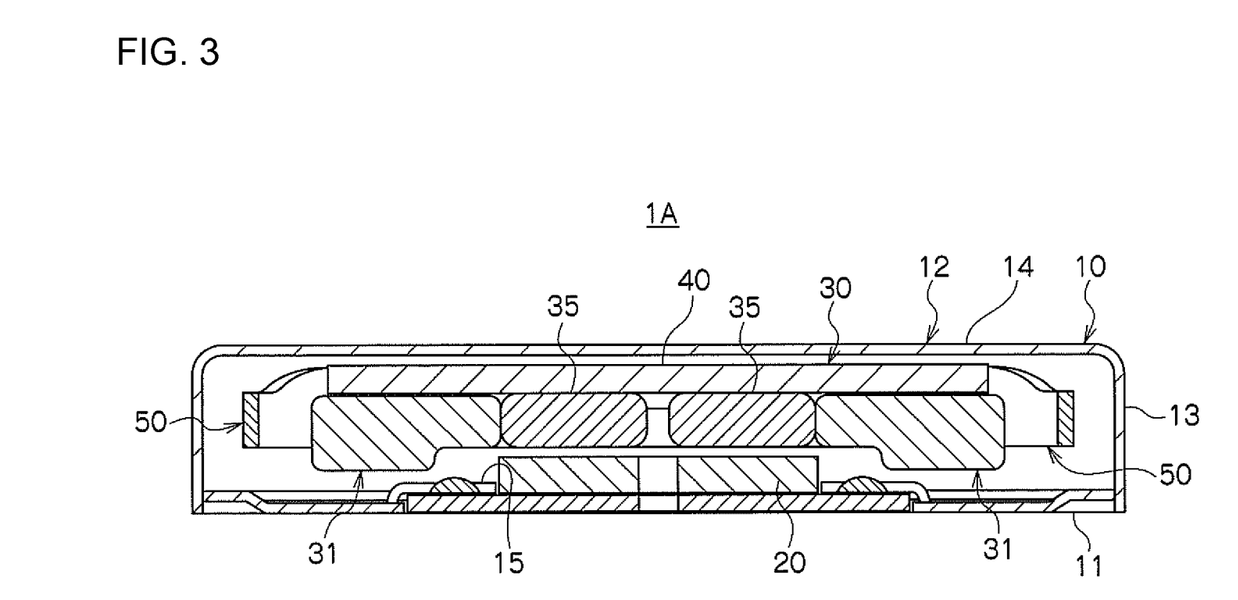
FIG. 3 is a vertical section view taken along line III-III in FIG. 2.

Referring to FIGS. 1 through 3, the vibration generator 1A preferably includes a housing 10 making up an outer shell. The housing 10 preferably includes a bottom member 11 and a case 12 capped on the bottom member 11. The case 12 preferably includes a circumferential wall portion 13 extending along the peripheral edge of the case 12 and a top portion 14 closing the top end of the case 12.

A coil 20 is arranged within the housing 10 and is positioned on the bottom member 11. A vibrating body 30 is arranged within the housing 10 in an opposing relationship with the coil 20. Band-like leaf springs 50 for supporting the vibrating body 30 with respect to the circumferential wall portion 13 are arranged within the housing 10.

The coil 20 is a hollow-core spiral coil formed by spirally winding a wire so that a space can be defined in the central region thereof. The vibrating body 30 is formed to have, e.g., a substantially rectangular contour. The vibrating body 30 is reciprocatingly vibrated in one direction between the coil 20 and the top portion 14 of the case 12 by virtue of the interaction of the magnetic fields generated by itself and the magnetic fields generated by the coil 20 arranged on the bottom member 11.

The leaf springs 50 are arranged in pair. The leaf springs 50 are arranged at the opposite sides of the vibrating body 30 in the vibration direction of the vibrating body 30 and are positioned between the vibrating body 30 and the circumferential wall portion 13 of the case 12, thereby supporting the vibrating body 30 on the circumferential wall portion 13. Each of the leaf springs 50 preferably includes a connection portion 51 connected to the vibrating body 30 at one longitudinal end thereof, an attachment portion 52 attached to the circumferential wall portion 13 at the other longitudinal end thereof and an intermediate portion 53 formed between the connection portion 51 and the attachment portion 52 to extend around the vibrating body 30. The connection portion 51 and the attachment portion 52 of each of the leaf springs 50 are arranged along a direction intersecting the vibration direction of the vibrating body 30. The vibrating body 30 is interposed between one transverse side and the other transverse side thereof. The connection portion 51 is connected to the vibrating body 30 at one transverse side of the vibrating body 30. The attachment portion 52 is attached to the circumferential wall portion 13 of the case 12 at the other transverse side of the vibrating body 30. The intermediate portion 53 of each of the leaf springs 50 preferably includes a plurality of curved sections 60, 61, 62 and 63 at which each of the leaf springs 50 extends in a curved shape. The intermediate portion 53 of each of the leaf springs 50 is positioned in the longitudinal outside region of the vibrating body 30 to extend across the vibration direction of the vibrating body 30.

In the vibration generator 1A configured as above, the leaf springs 50 arranged within the housing 10 can be formed to have a relatively large total length. In the vibration generator 1A configured as above, the intermediate portion 53 of each of the leaf springs 50 is provided with the curved sections 60, 61, 62 and 63. It is therefore possible to disperse the stresses generated in the leaf springs 50, thereby preventing large stresses from concentrating on one point. Accordingly, the lifespan of the leaf springs 50 can be prolonged in the vibration generator 1A configured as above.

The respective components of the present vibration generator will be described in more detail with reference to FIGS. 1 through 5.

Figure 5:
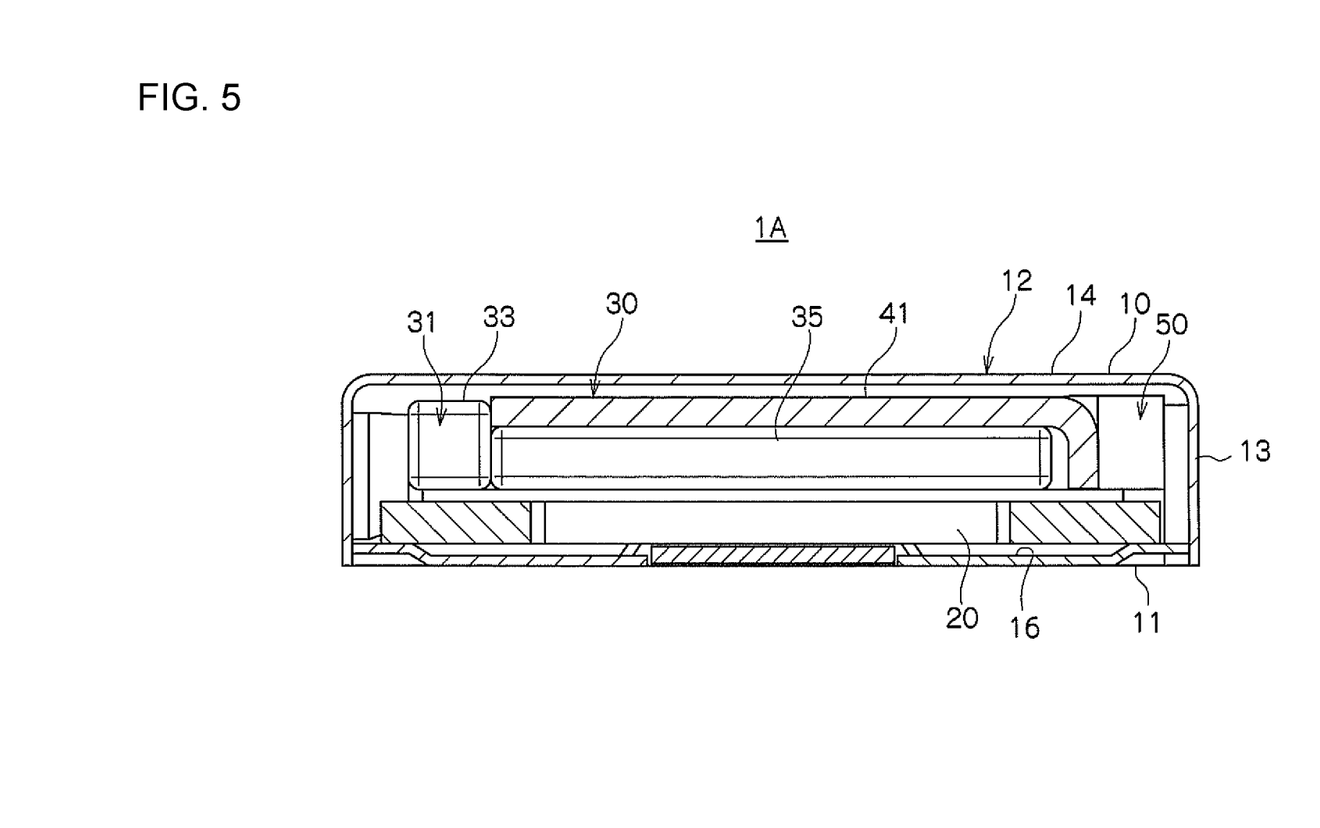
FIG. 5 is a vertical section view taken along line V-V in FIG. 2.

As shown in FIGS. 1, 3 and 5, the housing 10 makes up an outer shell of the vibration generator 1A. The housing 10 is formed into, e.g., a flat rectangular parallelepiped shape with a reduced height.

The housing 10 is made of a non-magnetic material. The housing 10 preferably includes a flat bottom member 11 formed into, e.g., a substantially rectangular shape and a case 12 capped on the bottom member 11. The case 12 preferably includes a circumferential wall portion 13 extending along the peripheral edge of the case 12 and a top portion 14 closing the top end of the case 12.

As shown in FIG. 1, the bottom member 11 has positioning protrusions 11a protruding outward from two points of each of four sides of the bottom member 11 defining the peripheral edge of the bottom member 11. The case 12 has recesses 13a formed on a lower surface of the circumferential wall portion 13 in a corresponding relationship with the positioning protrusions 11a. The positioning protrusions 11a are inserted into the recesses 13a. The bottom member 11 and the case 12 can be assembled together by inserting the positioning protrusions 11a of the bottom member 11 into the recesses 13a of the circumferential wall portion 13. The bottom member 11 has a coil holder 15 formed in the central region thereof. The coil 20 is held by the coil holder 15.

The coil 20 is a hollow-core spiral coil formed by spirally winding a wire through which an electric current flows such that a space is defined in the central region thereof. The coil 20 is formed into a substantially elliptical shape such that the longitudinal dimension thereof becomes longer than the transverse dimension thereof. The coil 20 is held by the coil holder 15 with the longitudinal direction thereof running orthogonal to the vibration direction of the vibrating body 30.

Figure 4:
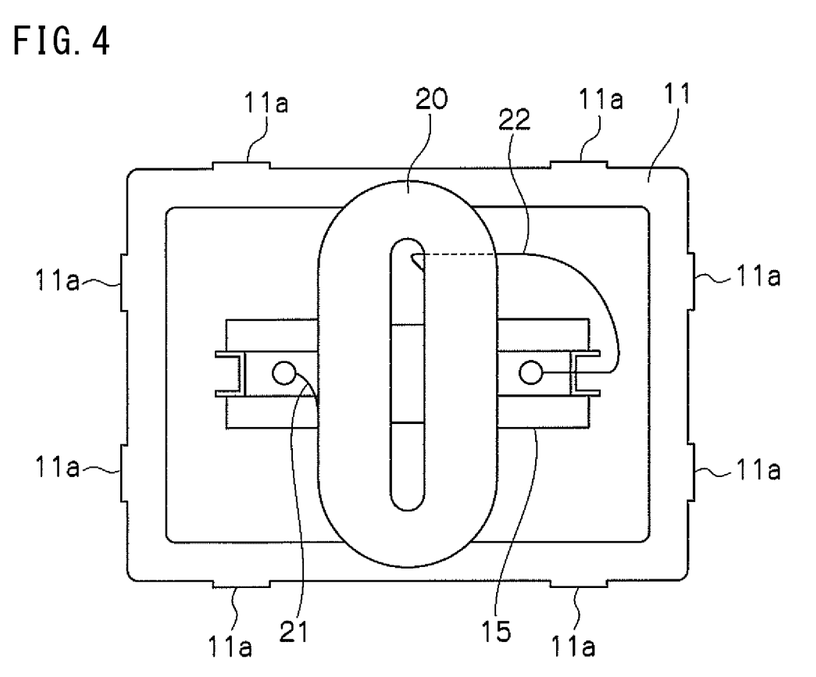
FIG. 4 is an explanatory view schematically illustrating a state in which a coil is attached to the vibration generator.

As shown in FIG. 4, the coil 20 preferably includes lead wires 21 and 22 extending from the inner and outer edges of the coil 20 toward the outside of the coil 20. If the lead wire 22 extending from the inner edge of the coil 20 is led out toward the outside of the coil 20 through between the bottom member 11 and the coil 20, the coil 20 is tilted because the lead wire 22 is gripped between the bottom member 11 and the coil 20. In the vibration generator 1A, as shown in FIG. 5, the bottom member 11 of the housing 10 has a communication groove 16 interconnecting the inside and the outside of the coil 20. The lead wire 22 extending from the inner edge of the coil 20 passes through the communication groove 16. As a consequence, the lead wire 22 is not gripped between the coil 20 and the bottom member 11. Accordingly, the coil 20 is held by the coil holder 15 without being tilted.

As shown in FIGS. 3 and 5, the vibrating body is arranged parallel to the coil 20 with a gap left between the vibrating body 30 and the upper surface of the coil 20, and is supported by the leaf springs 50. The vibrating body 30 is formed to have, e.g., a substantially rectangular overall shape. The vibrating body 30 preferably includes a pair of weights 31 arranged at the longitudinal opposite sides of the vibrating body 30, a pair of magnets 35 arranged inside the weights 31 and a cover 40 covering the magnets 35 from above. The weights 31, the magnets 35 and the cover 40 are one-piece formed with one another.

Each of the weights 31 preferably includes a lateral weight portion 32 extending in the transverse direction of the vibrating body 30 and a central weight portion 33 extending in the longitudinal direction of the vibrating body 30. Each of the weights 31 is formed into a substantially L-like shape by the lateral weight portion 32 and the central weight portion 33. The respective weights 31 are arranged in a symmetrical relationship with respect to the longitudinal center of the vibrating body 30. The tip ends of the central weight portions 33 extending in the longitudinal direction are opposed to each other. Since the respective weights 31 are symmetrically arranged while maintaining a left and right balance, the vibrating body 30 can vibrate smoothly. Each of the lateral weight portions 32 has a longitudinally-extending fitting groove 34 formed on the upper surface thereof at the transverse center thereof.

Each of the magnets 35 is formed into, e.g., a rectangular parallelepiped shape. The magnets 35 are arranged side by side between the weights 31 with the longitudinal direction thereof oriented in the transverse direction of the vibrating body 30. The magnets 35 are arranged in a well-balanced manner so as to become symmetrical with respect to the longitudinal center of the vibrating body 30.

The cover 40 is made of a magnetic material. The cover 40 preferably includes a body portion 41 covering the arrangement region of the magnets 35 from above. The cover 40 preferably further includes arm portions 42 extending outward from the left and right sides of the body portion 41. The arm portions 42 are fitted to the fitting grooves 34 of the respective weights 31.

The vibrating body 30 preferably includes seat surfaces 36 to which the leaf springs 50 are connected. The seat surfaces 36 are formed on the opposite side surface of the vibrating body 30 from the side surface of the vibrating body 30 on which the central weight portions 33 are arranged. The seat surfaces 36 are formed a little outward of the longitudinal center of the vibrating body 30 in a symmetrical relationship with each other.

The vibrating body 30 is arranged in a direction perpendicular to the longitudinal direction of the coil 20 having a substantially elliptical shape and is supported by the leaf springs 50.

The vibrating body 30 is reciprocatingly vibrated in the longitudinal direction of the vibrating body 30 by virtue of the interaction of the magnetic fields generated by the coil 20 and the magnetic fields generated by the magnets 35.

The leaf springs 50 are formed into, e.g., an elongated band shape. Each of the leaf springs 50 is arranged at each of the longitudinal opposite sides of the vibrating body 30. Each of the leaf springs 50 preferably includes the connection portion 51 connected to the vibrating body 30 at one longitudinal end thereof, the attachment portion 52 attached to the inner surface of the circumferential wall portion 13 of the case 12 at the other longitudinal end thereof and the intermediate portion 53 formed between the connection portion 51 and the attachment portion 52. The intermediate portion 53 of each of the leaf springs 50 preferably includes the plurality of curved sections 60, 61, 62 and 63 at which each of the leaf springs 50 extends in a curved shape.

The connection portion 51 and the attachment portion 52 are arranged along the direction intersecting the vibration direction of the vibrating body 30. The vibrating body 30 is interposed between one transverse side and the other transverse side thereof. The connection portion 51 is connected to the vibrating body 30 at one transverse side of the vibrating body 30. The attachment portion 52 is attached to the circumferential wall portion 13 at the other transverse side of the vibrating body 30. The connection portion 51 is formed by linearly extending one end of each of the leaf springs 50 and is bonded to one of the seat surfaces 36 of the vibrating body 30. The attachment portion 52 is formed by linearly extending the other end of each of the leaf springs 50 and is bonded to the circumferential wall portion 13 of the case 12.

The intermediate portion 53 extends from the connection portion 51 toward the attachment portion 52 around the vibrating body 30. The intermediate portion 53 is positioned in the longitudinal outside region of the vibrating body 30 to extend across the vibration direction of the vibrating body 30. Due to the existence of the curved section 63, the section of the intermediate portion 53 extending from the longitudinal outside region of the vibrating body 30 to the attachment portion 52 is largely curved toward the central region of the vibrating body 30.

The shape of each of the leaf springs 50 including the connection portion 51, the intermediate portion 53 and the attachment portion 52 will now be described in more detail.

In one transverse side region having the connection portion 51, due to the existence of the three curved sections 60, 61 and 62, each of the leaf springs 50 protrudes from the vibrating body 30 toward the circumferential wall portion 13. In the longitudinal outside region of the vibrating body 30, each of the leaf springs 50 is obliquely formed to go away from the vibrating body 30 and come close to the circumferential wall portion 13 of the case 12 as each of the leaf springs 50 extends from one transverse side region to the other transverse side region having the attachment portion 52. In the other transverse side region, due to the existence of the curved section 63, each of the leaf springs 50 is largely curved to extend from the longitudinal outside region of the vibrating body 30 toward the central region of the vibrating body 30.

In each of the leaf springs 50, the connection portion 51 and the attachment portion 52 are arranged along a direction intersecting the vibration direction of the vibrating body 30 and are positioned at one transverse side and the other transverse side of the vibrating body 30 with the vibrating body 30 interposed between one transverse side and the other transverse side. Accordingly, each of the leaf springs 50 can be formed to have a relatively large total length. Each of the leaf springs 50 has the plurality of curved sections 60, 61, 62 and 63. In the longitudinal outside region of the vibrating body 30, the intermediate portion 53 of each of the leaf springs 50 is obliquely formed to go away from the vibrating body 30 and come close to the circumferential wall portion 13 as the intermediate portion 53 extends from one transverse side region to the other transverse side region. It is therefore possible to effectively prolong the total length of each of the leaf springs 50 within a limited space defined between the vibrating body 30 and the circumferential wall portion 13. Each of the leaf springs 50 is gently deformed in the curved sections 60, 61, 62 and 63. Therefore, as compared with a case where each of the leaf springs 50 is deformed at an acute angle, it is possible to reduce the stresses generated in the curved sections 60, 61, 62 and 63. Since the curved sections 60, 61, 62 and 63 are formed in plural numbers, it is possible to disperse the stresses generated in each of the leaf springs 50.

The respective components described above are assembled together by capping the case 12 on the bottom member 11 in a state that the coil 20 is held by the coil holder 15 of the bottom member 11 and the vibrating body 30 is supported on the circumferential wall portion 13 of the case 12 by the leaf springs 50. In the state that the respective components are assembled together, a specified gap exists between the upper surface of the coil 20 and the lower surface of the vibrating body 30 as shown in FIGS. 3 and 5. Moreover, a specified gap exists between the upper surface of the vibrating body 30 and the lower surface of the top portion 14 of the case 12.

In the vibration generator 1A described above, the coil 20 generates magnetic fields if an electric current flows through the coil 20. The vibrating body 30 is reciprocatingly vibrated in the longitudinal direction of the vibrating body 30 by virtue of the interaction of the magnetic fields generated by the coil 20 and the magnetic fields generated by the magnets 35 of the vibrating body 30. Since the vibrating body 30 is supported by the leaf springs 50 between the coil 20 and the top portion 14 of the case 12, it is possible for the vibrating body 30 to make smooth reciprocating vibrations.

Second Preferred Embodiment

Figure 6:
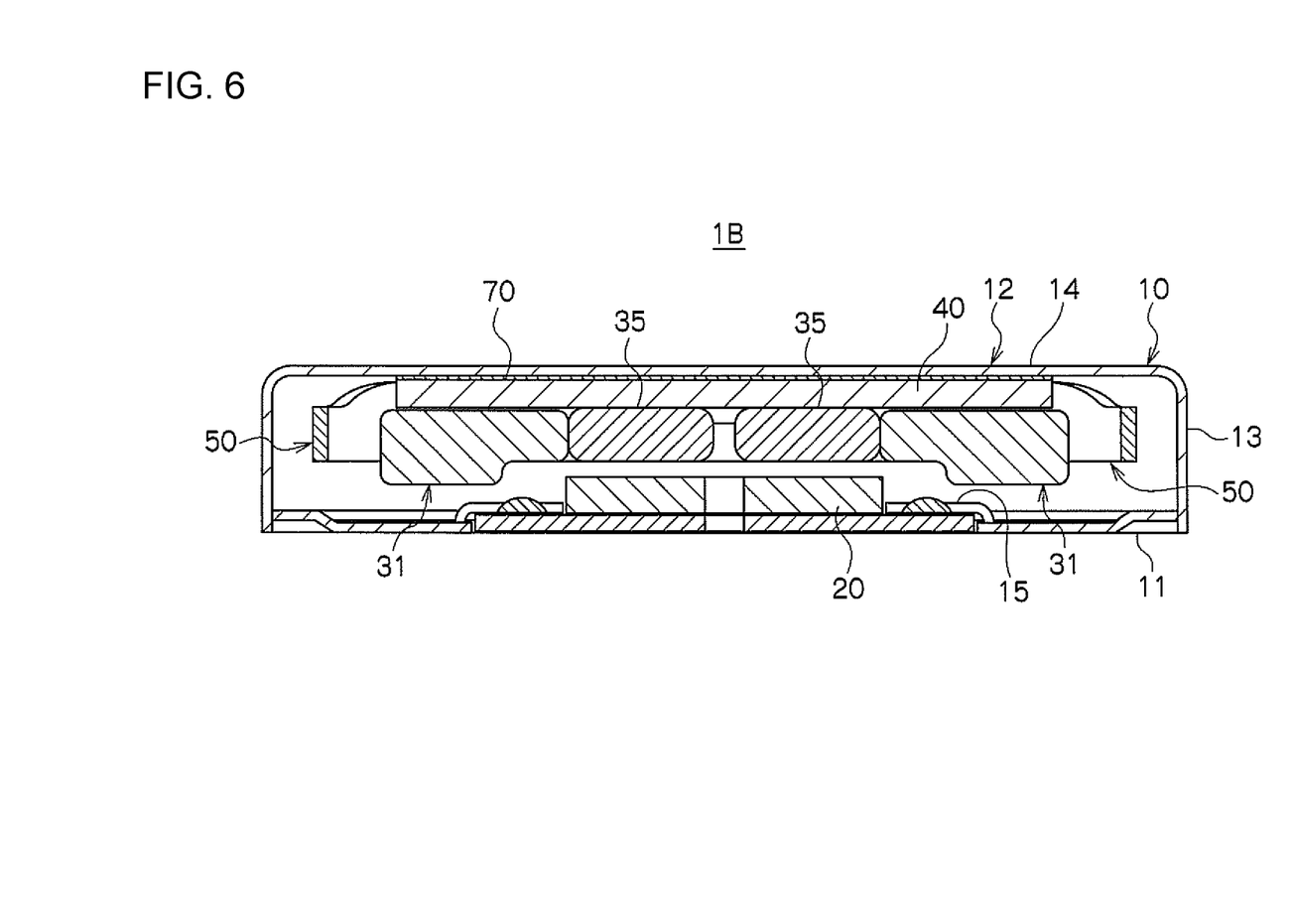
FIG. 6 is a vertical section view showing a vibration generator according to a second preferred embodiment of the present invention.

A vibration generator 1B according to a second preferred embodiment preferably includes, in addition to the components of the vibration generator 1A of the first preferred embodiment, a sliding member 70 arranged on the upper surface of the vibrating body 30.

The basic configuration of the vibration generator 1B of the second preferred embodiment is the same as that of the vibration generator 1A of the first preferred embodiment. For that reason, the same components as those of the vibration generator 1A of the first preferred embodiment will be designated by like reference symbols and will be described briefly. Only the components differing from those of the vibration generator 1A of the first preferred embodiment will be described in detail.

Referring to FIG. 6, the vibration generator 1B of the second preferred embodiment preferably includes a housing 10 making up an outer shell of the vibration generator 1B. The housing 10 is made of a non-magnetic material and is small in height. The housing 10 preferably includes a bottom member 11 and a case 12 capped on the bottom member 11. The case 12 preferably includes a circumferential wall portion 13 extending along the peripheral edge of the case 12 and a top portion 14 closing the top end of the case 12.

A coil 20 is arranged within the housing 10 and is positioned on the bottom member 11. A vibrating body 30 is arranged within the housing 10 in an opposing relationship with the coil 20. Leaf springs 50 for supporting the vibrating body 30 with respect to the circumferential wall portion 13 are arranged within the housing 10.

The coil 20 is a hollow-core spiral coil and is held by a coil holder 15 attached to the bottom member 11. Lead wires 21 and 22 extend from the inner and outer edges of the coil 20, respectively. The lead wire 22 extending from the inner edge of the coil 20 extends to the outside of the coil 20 through a communication groove 16 of the bottom member 11 interconnecting the inside and the outside of the coil 20 (see FIGS. 4 and 5).

The vibrating body 30 is formed to have, e.g., a substantially rectangular contour. The vibrating body 30 preferably includes a pair of weights 31 arranged at the longitudinal opposite sides of the vibrating body 30, a pair of magnets 35 arranged between the weights 31 and a cover 40 covering the magnets 35 from above. The weights 31, the magnets 35 and the cover 40 are one-piece formed with one another.

Each of the weights 31 is formed into a substantially L-like shape by a lateral weight portion 32 and a central weight portion 33. The respective weights 31 are arranged in a symmetrical relationship. The tip ends of the central weight portions 33 of the weights 31 extending in the longitudinal direction are opposed to each other. Each of the magnets 35 is formed into, e.g., a rectangular parallelepiped shape. The magnets 35 are arranged between the weights 31 with the longitudinal direction thereof oriented in the transverse direction of the vibrating body 30. The magnets 35 of the second preferred embodiment are arranged in a symmetrical relationship.

The cover 40 is made of a magnetic material. The cover 40 preferably includes a body portion 41 covering the region, being located between the weights 31 and the magnets 35 being arranged therein, from above. The cover 40 preferably further includes arm portions 42 extending outward from the left and right sides of the body portion 41. The arm portions 42 are fitted to the fitting grooves 34 of the respective weights 31.

The cover 40 preferably includes a sliding member 70 arranged on the upper surface of the cover 40 and made of a material that generates extremely low friction between the cover 40 and the top portion 14 of the case 12. The sliding member 70 is formed by bonding a sheet-like member to the upper surface of the cover 40 or by coating paint on the upper surface of the cover 40. The sliding member 70 having a sheet shape is made of, e.g., polyimide or polyetheretherketone (PEEK). In case where the sliding member 70 is formed by paint coating, a fluorine resin such as polytetrafluoroethylene formed of tetrafluoroethylene polymers may be coated on the upper surface of the cover 40. The sliding member 70 may be arranged on the inner surface of the top portion 14 of the housing 10.

The vibrating body 30 preferably includes seat surfaces 36 to which the leaf springs 50 are connected. The seat surfaces 36 are formed on the opposite side surface of the vibrating body 30 from the side surface of the vibrating body 30 on which the central weight portions 33 are arranged. The seat surfaces 36 are formed a little outward of the longitudinal center of the vibrating body 30 in a symmetrical relationship with respect to the longitudinal center of the vibrating body 30.

The leaf springs 50 are arranged at the opposite sides of the vibrating body 30 in the vibration direction of the vibrating body 30 and are positioned between the vibrating body 30 and the circumferential wall portion 13 of the case 12 to support the vibrating body 30 on the circumferential wall portion 13 (see FIG. 2). Each of the leaf springs 50 preferably includes a connection portion 51 connected to the vibrating body 30 at one longitudinal end of each of the leaf springs 50, an attachment portion 52 attached to the circumferential wall portion 13 at the other longitudinal end of each of the leaf springs 50 and an intermediate portion 53 formed between the connection portion 51 and the attachment portion 52 to extend around the vibrating body 30. The connection portion 51 and the attachment portion 52 of each of the leaf springs 50 are arranged along a direction intersecting the vibration direction of the vibrating body 30. The vibrating body 30 is interposed between one transverse side and the other transverse side thereof. The connection portion 51 is connected to the vibrating body 30 at one transverse side of the vibrating body 30. The attachment portion 52 is attached to the circumferential wall portion 13 of the case 12 at the other transverse side of the vibrating body 30.

The respective components described above are assembled together by capping the case 12 on the bottom member 11 in a state that the coil 20 is held by the coil holder 15 of the bottom member 11 and the vibrating body 30 is supported on the circumferential wall portion 13 by the leaf springs 50. In the state that the respective components are assembled together, a specified gap exists between the upper surface of the coil 20 and the lower surface of the vibrating body 30 as shown in FIG. 6. In contrast, the upper surface of the cover 40 of the vibrating body 30 makes contact with the top portion 14 of the case 12 through the sliding member 70.

In the vibration generator 1B according to the second preferred embodiment, the vibrating body 30 is reciprocatingly vibrated in such a manner as to slide along the top portion 14 of the case 12. Movement of the vibrating body 30 in the up-down direction is restrained by the top portion 14 of the case 12. Therefore, there is no possibility that the vibrating body 30 is tilted up and down during vibration. Since the vibrating body 30 makes contact with the top portion 14 of the case 12 through the sliding member 70 arranged on the upper surface of the cover 40, the vibrating body 30 can smoothly vibrate without generating any strange noise.

While a pair of leaf springs 50 is arranged at the opposite sides of the vibrating body 30 in the vibration generator 1A of the first preferred embodiment and the vibration generator 1B of the second preferred embodiment, it may possible to use a one-piece leaf spring. For example, the leaf springs arranged at the opposite sides of the vibrating body 30 may be formed into a one-piece member by interconnecting the connection portions 51 thereof or by interconnecting the attachment portions 52 thereof. If the leaf springs 50 are formed into a one-piece member, it becomes possible to reduce the number of components. Along with the reduction in the number of components, it is possible to reduce the number of assembling steps and to facilitate an assembling process. The fixing strength and the accuracy of the leaf springs 50 can be increased by forming the leaf springs 50 into a one-piece member.

While various preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vibration generator, comprising:
 a housing including a circumferential wall portion extending along a peripheral edge of the housing;
 a vibrating body arranged inside of the circumferential wall portion of the housing in an opposing relationship with a coil and configured to reciprocatingly vibrate in one direction;
 a band-like leaf spring arranged between the vibrating body and the circumferential wall portion to support the vibrating body on the circumferential wall portion,
 wherein the leaf spring includes a connection portion connected to the vibrating body at one longitudinal end of the leaf spring, an attachment portion attached to the circumferential wall portion at the other longitudinal end of the leaf spring and an intermediate portion extended between the connection portion and the attachment portion around the vibrating body,
 the connection portion and the attachment portion are arranged along a direction intersecting a vibration direction of the vibrating body at opposite sides of the vibrating body, and
 the intermediate portion is arranged to extend across the vibration direction of the vibrating body in an outside region around the vibrating body.

2. The vibration generator of claim 1, wherein the intermediate portion includes a plurality of curved sections at which the leaf spring extends in a curved shape.

3. The vibration generator of claim 2, wherein the leaf spring is curved to protrude from the vibrating body toward the circumferential wall portion in a region on the side of the connection portion, the leaf spring being obliquely formed in the longitudinal outside region of the vibrating body to go away from the vibrating body and come close to the circumferential wall portion as the leaf spring extends from the side of the connection portion to the side of the attachment portion, the leaf spring being curved from the outside region around the vibrating body toward a central region of the vibrating body on the side of the attachment portion.

4. The vibration generator of claim 1, wherein the leaf spring includes first and second leaf springs respectively arranged at the opposite sides of the vibrating body in the vibration direction of the vibrating body.

5. The vibration generator of claim 4, wherein the first and second leaf springs are formed into a one-piece member.

6. The vibration generator of claim 1, wherein the housing further includes a bottom member to which the coil is attached and a top portion arranged to close a top end of the housing, the vibrating body including an upper surface making contact with an inner surface of the top portion, and the vibration generator further comprises: a sliding member arranged on at least one of the upper surface of the vibrating body and the inner surface of the top portion to smoothly slide the vibrating body with respect to the inner surface of the top portion.

7. The vibration generator of claim 1, wherein the coil is a hollow-core spiral coil formed by spirally winding a wire, the bottom member of the housing having a communication groove interconnecting the inside and the outside of the coil, the coil including a lead wire extending from an inner edge of the coil and passing through the communication groove.

* * * * *